United States Patent
Lu et al.

(10) Patent No.: US 10,245,701 B2
(45) Date of Patent: Apr. 2, 2019

(54) 3D MAGNETORHEOLOGICAL POLISHING DEVICE AND MAGNETORHEOLOGICAL POLISHING FLUID

(71) Applicant: Kunshan Nano New Material Technology Co., Ltd., Kunshan (CN)

(72) Inventors: Hung-Tu Lu, Taipei (TW); Wu-Chu Shih, Taipei (TW); Wei-Nung Hsu, Taipei (TW); Dingai Xiang, Kunshan (CN)

(73) Assignee: Kunshan Nano New Material Technology Co., Ltd., Kunshan (CN)

( * ) Notice: Subject to any disclaimer, the term of this patent is extended or adjusted under 35 U.S.C. 154(b) by 28 days.

(21) Appl. No.: 15/497,988

(22) Filed: Apr. 26, 2017

(65) Prior Publication Data

US 2018/0200862 A1    Jul. 19, 2018

(30) Foreign Application Priority Data

Jan. 13, 2017   (TW) .............................. 106101301 A

(51) Int. Cl.
| | |
|---|---|
| *B24B 31/10* | (2006.01) |
| *C09G 1/02* | (2006.01) |
| *C09K 3/14* | (2006.01) |
| *H01F 1/44* | (2006.01) |

(52) U.S. Cl.
CPC .............. *B24B 31/102* (2013.01); *C09G 1/02* (2013.01); *C09K 3/1409* (2013.01); *H01F 1/447* (2013.01)

(58) Field of Classification Search
CPC ...... B24B 31/102; C09G 1/02; C09K 3/1409; H01F 1/447

USPC ............................................................. 451/5
See application file for complete search history.

(56) References Cited

U.S. PATENT DOCUMENTS

| | | | | |
|---|---|---|---|---|
| 2,883,809 A * | 4/1959 | Simjian | ................ | B24B 31/003 451/113 |
| 5,449,313 A * | 9/1995 | Kordonsky | ............. | B24B 1/005 451/104 |
| 5,951,369 A * | 9/1999 | Kordonski | ............... | B24B 1/005 451/36 |
| 5,957,753 A * | 9/1999 | Komanduri | ............. | B24B 1/005 451/113 |
| 6,413,441 B1 * | 7/2002 | Levin | ...................... | B24B 1/005 252/62.52 |
| 2003/0087585 A1 * | 5/2003 | Kordonsky | ............. | B24B 1/005 451/5 |
| 2008/0283502 A1 * | 11/2008 | Moeggenborg | ..... | B24B 37/0056 216/88 |

(Continued)

FOREIGN PATENT DOCUMENTS

CN       201510793529.8       4/2016

*Primary Examiner* — George B Nguyen
(74) *Attorney, Agent, or Firm* — Wang Law Firm, Inc.

(57) ABSTRACT

A 3D magnetorheological polishing device and a magnetorheological polishing fluid are provided. The 3D magnetorheological polishing device includes a container and a magnetic field generator. The container is disposed with an accommodation space to accommodate a polishing fluid and a workpiece that is to be polished. The container is disposed on the magnetic field generator and rotates synchronously with the magnetic field generator. The container and the magnetic field generator are capable of rotating in conjunction at a predetermined speed, such that the polishing efficiency is improved.

9 Claims, 3 Drawing Sheets

(56) References Cited

U.S. PATENT DOCUMENTS

2013/0273816 A1* 10/2013 Kan .................... B24B 49/00
                                                   451/11
2014/0020305 A1*  1/2014 Kordonski ............ C09G 1/02
                                                   51/309

* cited by examiner

3D MAGNETORHEOLOGICAL POLISHING DEVICE AND MAGNETORHEOLOGICAL POLISHING FLUID

CROSS-REFERENCE TO RELATED APPLICATION

This application claims priority from Taiwan Patent Application No. 106101301, filed on Jan. 13, 2017, at the Taiwan Intellectual Property Office, the content of which is hereby incorporated by reference in its entirety for all purposes.

BACKGROUND OF THE INVENTION

1. Field of the Invention

The present disclosure is related to the field of polishing, and especially related to a 3D magnetorheological polishing device and magnetorheological polishing fluid, of which the container rotates at a predetermined speed along with a magnetic field generator.

2. Description of the Related Art

With the advancement of unibody molding technology such as 3D printing and MIM (Metal Injection Molding) and the recent development in computer numerical control (CNC), the exterior parts of many products tend to be 3D structures that are integrally formed. Therefore, there is an increasing requirement for better surface machining technology for the surface finishing in the latter stage of the production. Moreover, the decorative pieces of many products, e.g. mobile phones, watches, etc., require highly even and high grade surface finishing. Besides, in order to avoid the damage of the protective layers (such as the damage to the anode layer after polishing the anode), the amount of surface removed has to be precisely controlled. Therefore, the development of a non-contact polishing technique that is capable of 3D polishing is a pressing issue.

Magnetorheological polishing is the polishing of workpiece by taking advantage of the rheological properties of the magnetorheological polishing fluid. By combining with computer numerical control technology, the polished amount can be controlled precisely, and a nanometer scale surface roughness can be achieved. Magnetorheological polishing is a non-contact polishing technique that is capable of polishing the entire workpiece. However, the magnetorheological polishing equipment available commercially mainly find its application in the field of precision machining, such as precision optics, especially for the machining of aspherical lenses.

The magnetorheological polishing equipment that is suitable for polishing 3D shapes can also be found in the state of the art, for example Patent Application Number CN201510793529.8. However, such equipment has the following disadvantages: 1. The magnetic field is constant. Therefore, during the polishing, the workpiece has to be moved by the mechanical system in order to produce the motion relative to the polishing fluid in order to polish the workpiece. Thus the polishing efficiency is low. 2. Although the polishing mechanical system disclosed in the aforementioned patent is capable of rotating, revolving, and vibrating to give the workpiece two motional degrees of freedom, during the polishing of 3D workpiece with complex structural details, the singular movement trajectory will cause uneven overall polishing effect. In addition, any nuances in the installation angle of the workpiece will have a huge impact on the polishing effect. During complex polishing that involves multiple stages, the operator might have to manually adjust the angle for each of the polishing stage. Therefore, the device in the prior art is too complicated to handle, and the efficiency thereof is low.

Therefore, the inventor has invented a 3D magnetorheological polishing device and a magnetorheological polishing fluid, which aim to solve the problems identified above and improve practical utility.

SUMMARY OF THE INVENTION

Therefore, the present disclosure provides a 3D magnetorheological polishing device and a magnetorheological polishing fluid to tackle the problems identified above.

To this aim, 3D magnetorheological polishing device is provided, which may include a container and a magnetic field generator. The container may be disposed with an accommodation space to accommodate a polishing fluid and a workpiece that is to be polished. The container may be disposed on the magnetic field generator and may rotate synchronously with the magnetic field generator at the rotational speed of 0-300 RPM.

In a preferred embodiment, the magnetic field generated by the magnetic field generator may be distributed evenly around the accommodation space. The magnetic field strength at a vertical height of 6-10 cm from the surface of the container may be no lower than 0.2 T.

In a preferred embodiment, the magnetorheological polishing fluid may include: a carrier fluid, magnetic particles, abrasives, and additives. The carrier fluid may be water-based or non-water-based and the content thereof may be 28-38 wt %. The content of the magnetic particles may be 50-60 wt %, the content of the abrasives may be 2-12 wt %, and the content of the additives may be 0.1-1 wt %.

In a preferred embodiment, the magnetic particles may be made of carbonyl iron powder with particle size of 1-10 μm and carbonyl iron-nickel alloy powder with particle size of 1-5 μm, at a ratio of 9:1.

In a preferred embodiment, the abrasives may be colloidal silica with particle size of 110-130 nm, and the abrasives may be selected from one of mono-crystalline diamond, polycrystalline diamond, aluminum oxide, silicon carbide, iron(III) oxide, silicon oxide, and cerium(IV) oxide, or a combination thereof.

In a preferred embodiment, the additives may include a dispersant, a suspending agent, a surfactant, a lubricant, and an antioxidant.

In a preferred embodiment, the 3D magnetorheological polishing device may further include a control device that is electrically connected to the magnetic field generator. The control device may control a polishing duration, the magnetic field strength, a direction in which the magnetic field rotates, and the rotational speed thereof.

In a preferred embodiment, the 3D magnetorheological polishing device may further include a holding mechanism. The holding mechanism may include a main shaft and a clamp. The main shaft may have a plurality of degrees of freedom for movements thereof. The clamp may be rotatably connected to the main shaft and may be configured to hold the workpiece.

In a preferred embodiment, the 3D magnetorheological polishing device may further include a control device that is electrically connected to the holding mechanism to control a movement trajectory of the holding mechanism.

To this aim, a magnetorheological polishing fluid is further provided. The magnetorheological polishing fluid may include a carrier fluid, magnetic particles, abrasives, and additives. The carrier fluid may be water-based or non-water-based and the content thereof may be 28-38 wt %. The content of the magnetic particles may be 50-60 wt %, the content of the abrasives may be 2-12 wt %, and the content of the additives may be 0.1-1 wt %. The magnetic particles may be made of carbonyl iron powder with particle size of 1-10 μm and carbonyl iron-nickel alloy powder with particle size of 1-5 μm, at a ratio of 9:1. The abrasives may be colloidal silica with particle size of 110-130 nm, and the abrasives may be selected from one of mono-crystalline diamond, polycrystalline diamond, aluminum oxide, silicon carbide, iron(III) oxide, silicon oxide, and cerium(IV) oxide, or a combination thereof. The additives may include a dispersant, a suspending agent, a surfactant, a lubricant, and an antioxidant.

The 3D magnetorheological polishing device of the present disclosure is capable of overcoming the problems regarding low polishing efficiency, uneven polishing effects for workpieces with complex 3D geometry, and cumbersome operational process that is persistent in the conventional magnetorheological polishing device.

Various aspects such as the technical features, advantages or content of the present disclosure will be set forth in detail in the form of preferred embodiments hereinafter, and the description will be made along with reference to the attached drawings.

DESCRIPTION OF THE PREFERRED EMBODIMENTS

The present invention will be described with some preferred embodiments thereof and it is understood that many changes and modifications in the described embodiments can be carried out without departing from the scope and the spirit of the invention that is intended to be limited only by the appended claims.

A magnetorheological polishing device suitable for complex 3D geometry machining at high efficiency is provided. More specifically, a magnetorheological polishing device capable of rotating the magnetic field and a corresponding magnetorheological polishing fluid are provided, which are related in terms of their technicalities (having identical or corresponding essential technical feature). Various embodiments of the 3D magnetorheological polishing device of the present disclosure will be set forth with reference to the accompanying drawings. For the ease of understanding, similar elements will be denoted by similar labels in the embodiments below.

The 3D magnetorheological polishing device and the magnetorheological polishing fluid of the present disclosure may enhance the polishing force thereof by rotating the magnetic field. In addition, by replacing the mechanical system with multi-axis robotic arms and programmable control system, and by incorporating the magnetorheological polishing fluid, the 3D magnetorheological polishing device that is capable of polishing workpieces in 3D can be achieved. The working principle of the polishing device of the present disclosure shall be set forth below. Under the influence of the magnetic field, the magnetorheological fluid in the container will form numerous soft "grinding heads" (brushes) along the magnetic field lines, and the workpiece controlled by the holding mechanism may be enclosed by these brushes. These brushes may grind the workpiece with 3D surface to achieve surface polishing. It is worth noting that, the container and the magnetic field generator may be driven together by a mechanical system to rotate at a certain speed, so as to increase the polishing force of the magnetic brushes.

Figure 1:
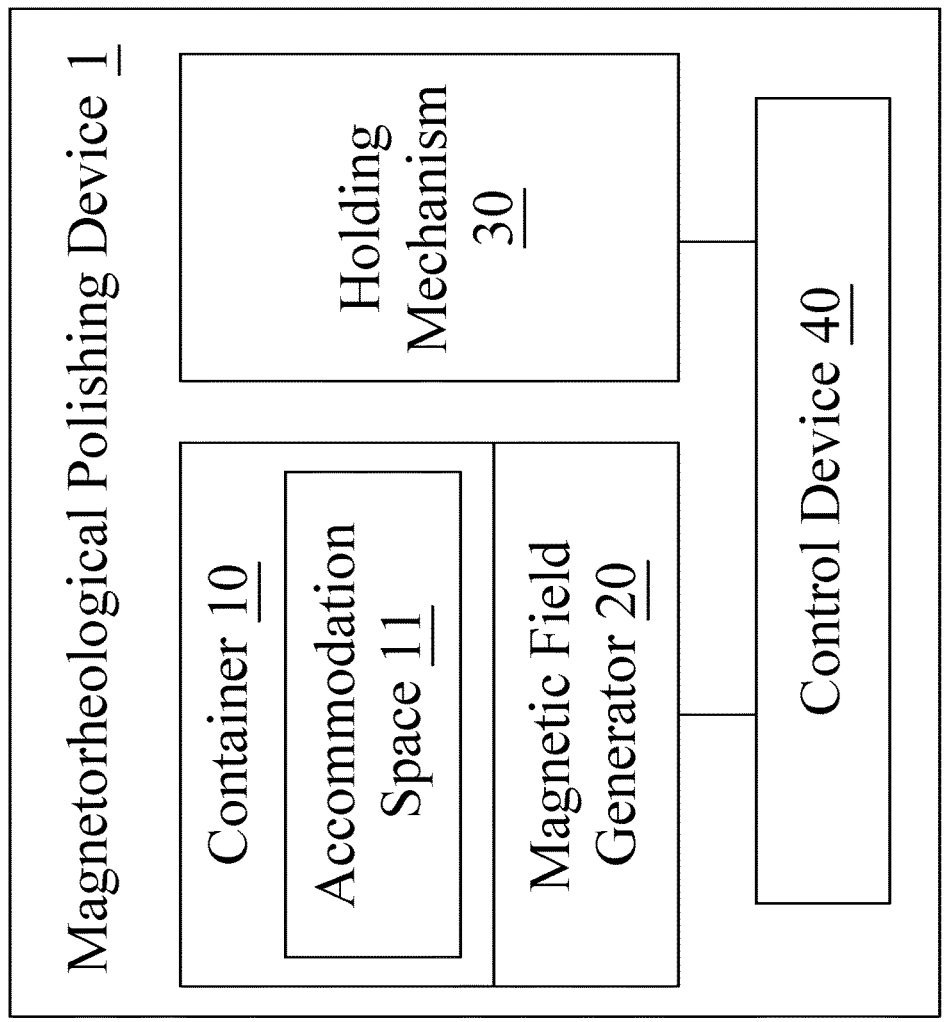
FIG. 1 is the block diagram for the 3D magnetorheological polishing device of the present disclosure.
Figure 2:
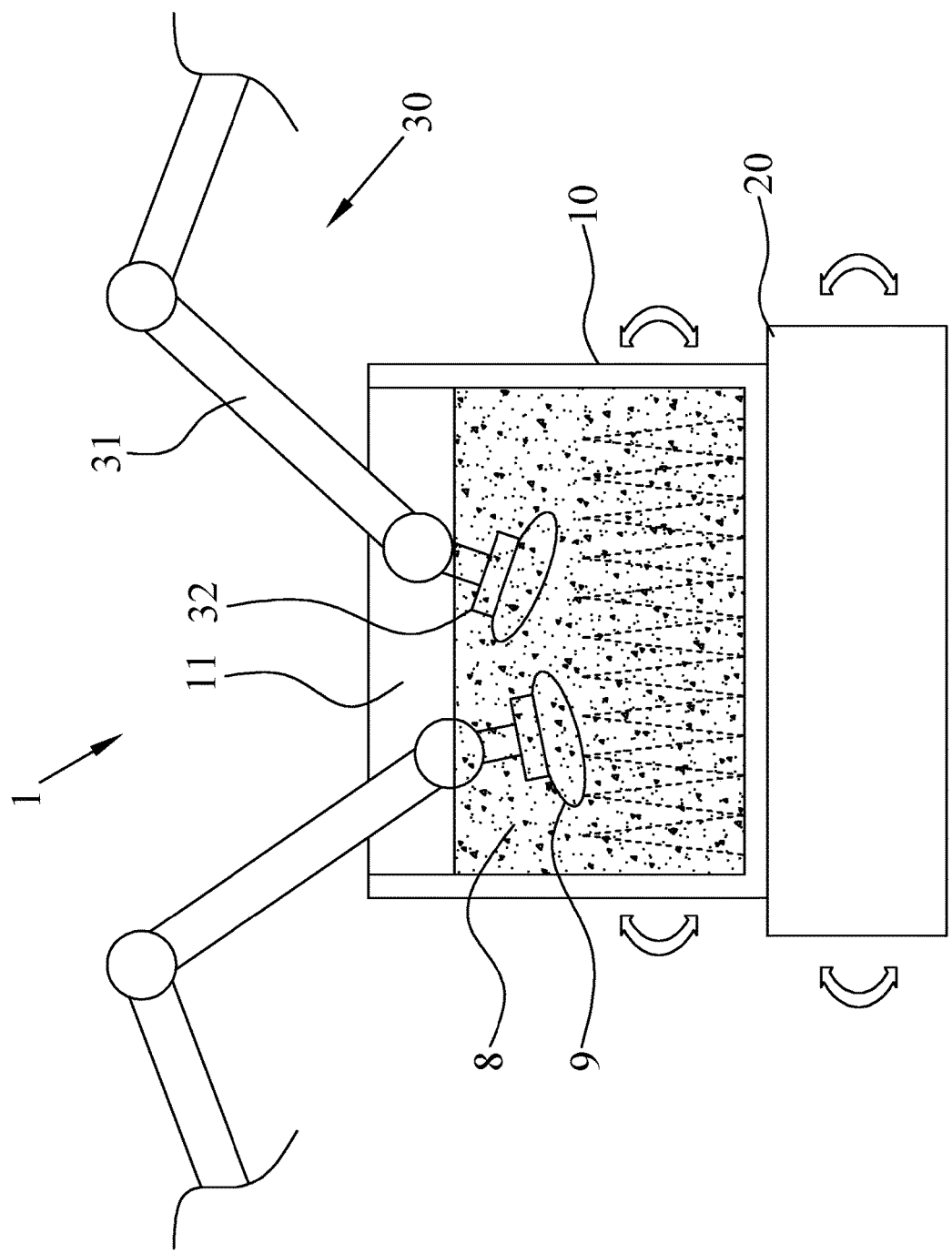
FIG. 2 is the structural schematic diagram for the 3D magnetorheological polishing device of the present disclosure.

The descriptions below make reference to FIGS. 1 and 2, which are the block diagram and structural schematic diagram for the 3D magnetorheological polishing device of the present disclosure, respectively.

As shown in the drawings, the 3D magnetorheological polishing device 1 of the present disclosure may include a container 10, a magnetic field generator 20, a holding mechanism 30, and a control device 40. The container 10 may be disposed with an accommodation space 11 to accommodate a polishing fluid 8 and a workpiece 9 that is to be polished. The magnetic field generator 20 may be configured to bear the weight of the container 10, such that the container 10 may be disposed on the magnetic field generator 20. In addition, the container 10 may rotate synchronously with the magnetic field generator 20. The rotational speed thereof may range from 0 to 300 RPM. The holding mechanism may include a main shaft 31 and a clamp 32. The main shaft 31 may move in a plurality of degrees of freedom. The clamp 32 may be rotatably connected to the main shaft 31 and may be configured to hold the workpiece 9. The control device 40 may be electrically connected to the magnetic field generator 20 and the holding mechanism 30. The control device 40 may be configured to select and control various polishing parameters, such as the polishing settings or the polishing duration. The polishing parameters for each setting may include: the polishing duration, the magnetic field strength generated by the magnetic field generator 20, the rotational direction of the magnetic field generated by the magnetic field generator 20, the rotational speed thereof, the movement trajectory of the holding mechanism 30, etc.

More specifically, the magnetic field generator 20 may include power supply, toroidal coil, ferrite core, cooler, and other components. In contrast to conventional magnetorheological device, the magnetic field generated by the magnetic field generator 20 may be distributed evenly around the entirety of the accommodation space 11 of the container 10, so as to match the magnetorheological polishing fluid 8 to achieve better polishing effect. In addition, the magnetic field strength at a vertical height of 8 cm from the surface of the magnetic field generator 20 may be no lower than 0.2 T. The container 10 may be disposed above the magnetic field generator 20. The container 10 may be used to accommodate the polishing fluid 8 with magnetorheological properties and may serve as the region for polishing action.

The holding mechanism 30 may be a robotic arm, which may be formed from the main shaft 31 having at least four rotation axes and the clamp 32. Contrary to the conventional polishing device, the holding mechanism 30 and the polishing system (magnetic field generator 20 and the container 10) are disposed separately. Thus, the control device 40 may conveniently assign all kinds of movement trajectory to the holding mechanism 30, such that the workpiece 9 with 3D surface can be polished evenly and thoroughly.

Besides, the holding mechanism 30 may be agilely extended, and the degree of polishing may be conveniently adjusted according to the size and shape of the workpiece 9 that is to be polished. Owing to the transferability of the program to another device, the coded program may be transferred to other holding mechanism 30 to ensure that consistent movement trajectory can be performed by the other holding mechanism 30. Therefore, the polishing effects of all workpieces 9 can be guaranteed to be consistent, manual angle adjustment can be avoided, and therefore the polishing efficiency can be improved.

The control device 40 may be implemented using merely hardwares, or using softwares working in conjunction with certain general hardwares. However, in most of the occasions, the latter is better. For instance, the implementation of the hardwares may be achieved by combining the central processing unit (CPU) in a computing device and hard disk (HDD) or memory (RAM or ROM) for the storage of relevant softwares.

Figure 3:
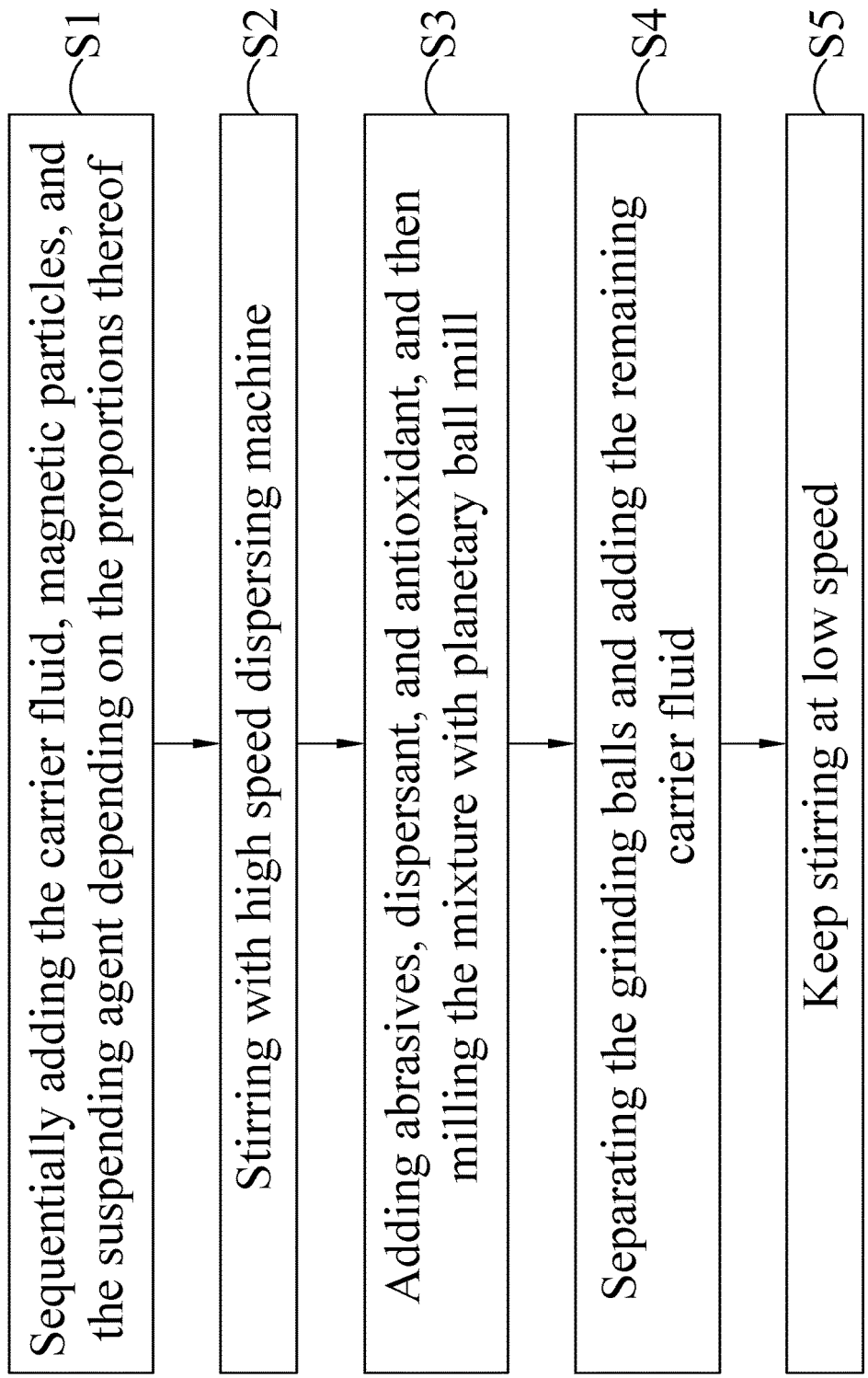
FIG. 3 is the flowchart for the preparation of the magnetorheological polishing fluid of the present disclosure.

The following descriptions make reference to FIG. 3, which is the flowchart for the preparation of the magnetorheological polishing fluid of the present disclosure.

The magnetorheological polishing fluid of the present disclosure is applicable to the aforementioned 3D magnetorheological polishing device. The magnetorheological polishing fluid may include the carrier fluid, the magnetic particles, the abrasives, and the additives. The carrier fluid may be water based or non-water based. Preferably, the carrier fluid may be ultra-pure deionized water with resistivity of no lower than 5 MΩ·cm, and the content of the carrier fluid may be 28-38 wt %. The content of the magnetic particles may be 50-60 wt %, and the magnetic particles may be carbonyl iron powder and carbonyl iron-nickel alloy powder ($Fe_{0.7}Ni_{0.3}$). The particle size of the carbonyl iron powder may be 1-10 μm, while the particle size of the carbonyl iron-nickel alloy powder may be 1-5 μm. The ratio of the carbonyl iron powder to the carbonyl iron-nickel alloy powder may be 9:1. The abrasives may be colloidal silica with particle size of 110-130 nm, preferably 120 nm. Depending on the material to the workpiece to be polished, the abrasives may have a fineness of less than 1 μm, and may be selected from one of mono-crystalline diamond, poly-crystalline diamond, aluminum oxide, silicon carbide, iron (III) oxide, silicon oxide, and cerium(IV) oxide, or a combination thereof. The content of the abrasives may be 2-12 wt %. The content of the additives may be 0.1-1 wt %. The additives may include a dispersant, a suspending agent, a surfactant, a lubricant, and an antioxidant.

For instance, the dispersant may be made of one or more of sodium polycarboxylate, sodium hexametaphosphate, sodium dodecyl sulfonate, and sodium dodecyl sulfate. The suspending agent may be made of one or more of sodium polyacrylate, carboxymethyl cellulose, hydroxyethyl cellulose, fumed silica, and polyacrylamide. The surfactant may be made of one or more of alkylphenol ethoxylates, fatty alcohol ethoxylates, and lauryl polyoxyethylene polyoxypropylene block polyether. The antioxidant may be made of one or more of orthophosphate, sodium nitrate, benzotriazole, and thiourea.

The preparation steps for the magnetorheological polishing fluid may be as follows: (S1) Sequentially adding the carrier fluid, e.g. half of the predetermined amount of the carrier fluid, magnetic particles, and the suspending agent depending on the proportions thereof; (S2) Stirring with high speed dispersing machine, for instance, for 30 mins at 1100 RPM; (S3) Adding abrasives, dispersant, and antioxidant, and then milling the mixture with planetary ball mill, for instance, for 1 hour; (S4) Separating and taking out the grinding balls and adding the remaining carrier fluid; and (S5) Keep stirring at low speed, e.g. 500 RPM for 10 mins.

The magnetorheological polishing fluid of the present disclosure may use water as the carrier fluid thereof, hence it is easy to clean. Besides, the magnetorheological polishing fluid may possess the advantages such as good suspension, no clumping or caking, high resistance against oxidation, low zero field viscosity, and high shear yield. The magnetorheological polishing fluid is especially suitable for metallic surfaces such as aluminum alloy and stainless steel (non-magnetic), and non-metallic surfaces such as glass and ceramics.

Therefore, in contrast to the prior art, the present disclosure may possess the following advantages:

(1) The container of the 3D magnetorheological polishing device may rotate along with the magnetic field generator. As the result, both the container and the workpiece can be rotated, and the relative motion will increase the polishing force. Besides, in the case of constant magnetic field, the workpiece has to be rotated at higher speed in order to achieve better polishing efficiency, and this may result in the instability of the mechanical system and uneven polishing effect.

(2) The holding mechanism of the 3D magnetorheological polishing device uses multi-axis robotic arms with programmable control system, which is independent from the magnetic field generator and the container. With this configuration, various movement trajectories can be achieve via the programs, and therefore the workpieces in all kinds of shapes can be polished evenly. In addition, owing to the transferability of the program to another device, the polishing stations can be expanded conveniently. Furthermore, the movement trajectory of the workpiece in each station can be guaranteed to be consistent, and therefore the polishing effect may be consistent.

(3) The magnetorheological polishing fluid corresponds to the 3D magnetorheological polishing device of the present disclosure, and hence the fluid can be cleaned easily, the viscosity thereof at zero field is low, and the shear yield is low. The magnetorheological polishing fluid of the present disclosure is especially suitable to polish metallic and non-metallic material.

While the present disclosure is described with some preferred embodiments, it is understood that many changes and modifications in the described embodiments can be carried out without departing from the scope and the spirit of the inventive concept that is intended to be limited only by the appended claims.

What is claimed is:

1. A 3D magnetorheological polishing device, comprising:
a container, the container being disposed with an accommodation space to accommodate a polishing fluid and a workpiece awaiting polishing; and
a magnetic field generator, the container being disposed on the magnetic field generator and being configured to rotate synchronously with the magnetic field generator, wherein a rotational speed thereof ranges from 0 to 300 RPM;
wherein a magnetic field generated by the magnetic field generator is distributed evenly around the accommodation space, and a magnetic field strength at a vertical height of 6-10 cm from a surface of the container is no lower than 0.2 T.

2. A 3D magnetorheological polishing device, comprising:
- a container, the container being disposed with an accommodation space to accommodate a polishing fluid and a workpiece awaiting polishing; and
- a magnetic field generator, the container being disposed on the magnetic field generator and being configured to rotate synchronously with the magnetic field generator, wherein a rotational speed thereof ranges from 0 to 300 RPM;
- wherein the polishing fluid comprises: a carrier fluid, magnetic particles, abrasives, and additives; the carrier fluid is water-based or non-water-based and a content thereof is 28-38 wt %, a content of the magnetic particles is 50-60 wt %, a content of the abrasives is 2-12 wt %, and a content of the additives is 0.1-1 wt %.

3. The 3D magnetorheological polishing device of claim 2, wherein the magnetic particles are made of carbonyl iron powder with particle size of 1-10 μm and carbonyl iron-nickel alloy powder with particle size of 1-5 μm, at a ratio of 9:1.

4. The 3D magnetorheological polishing device of claim 2, wherein the abrasives are colloidal silica with particle size of 110-130 nm, and the abrasives are selected from one of mono-crystalline diamond, polycrystalline diamond, aluminum oxide, silicon carbide, iron(III) oxide, silicon oxide, and cerium(IV) oxide, or a combination thereof.

5. The 3D magnetorheological polishing device of claim 2, wherein the additives comprise a dispersant, a suspending agent, a surfactant, a lubricant, and an antioxidant.

6. The 3D magnetorheological polishing device of claim 1, further comprising a control device that is electrically connected to the magnetic field generator, wherein the control device controls a polishing duration, the magnetic field strength, a rotational direction of the magnetic field, and the rotational speed thereof.

7. The 3D magnetorheological polishing device of claim 1, further comprising a holding mechanism, wherein the holding mechanism includes a main shaft and a clamp, the main shaft has a plurality of degrees of freedom for movements thereof, the clamp is rotatably connected to the main shaft and is configured to hold the workpiece.

8. The 3D magnetorheological polishing device of claim 7, further comprising a control device that is electrically connected to the holding mechanism to control a movement trajectory of the holding mechanism.

9. A magnetorheological polishing fluid, comprising:
- a carrier fluid,
- magnetic particles,
- abrasives, and
- additives;
- wherein the carrier fluid is water-based or non-water-based and a content thereof is 28-38 wt %, a content of the magnetic particles is 50-60 wt %, a content of the abrasives is 2-12 wt %, and a content of the additives is 0.1-1 wt %;
- the magnetic particles are made of carbonyl iron powder with particle size of 1-10 μm and carbonyl iron-nickel alloy powder with particle size of 1-5 μm, at a ratio of 9:1;
- the abrasives are colloidal silica with particle size of 110-130 nm, and the abrasives are selected from one of mono-crystalline diamond, polycrystalline diamond, aluminum oxide, silicon carbide, iron(III) oxide, silicon oxide, and cerium(IV) oxide, or a combination thereof;
- the additives comprise a dispersant, a suspending agent, a surfactant, a lubricant, and an antioxidant.

* * * * *